United States Patent Office 3,554,037
Patented Jan. 12, 1971

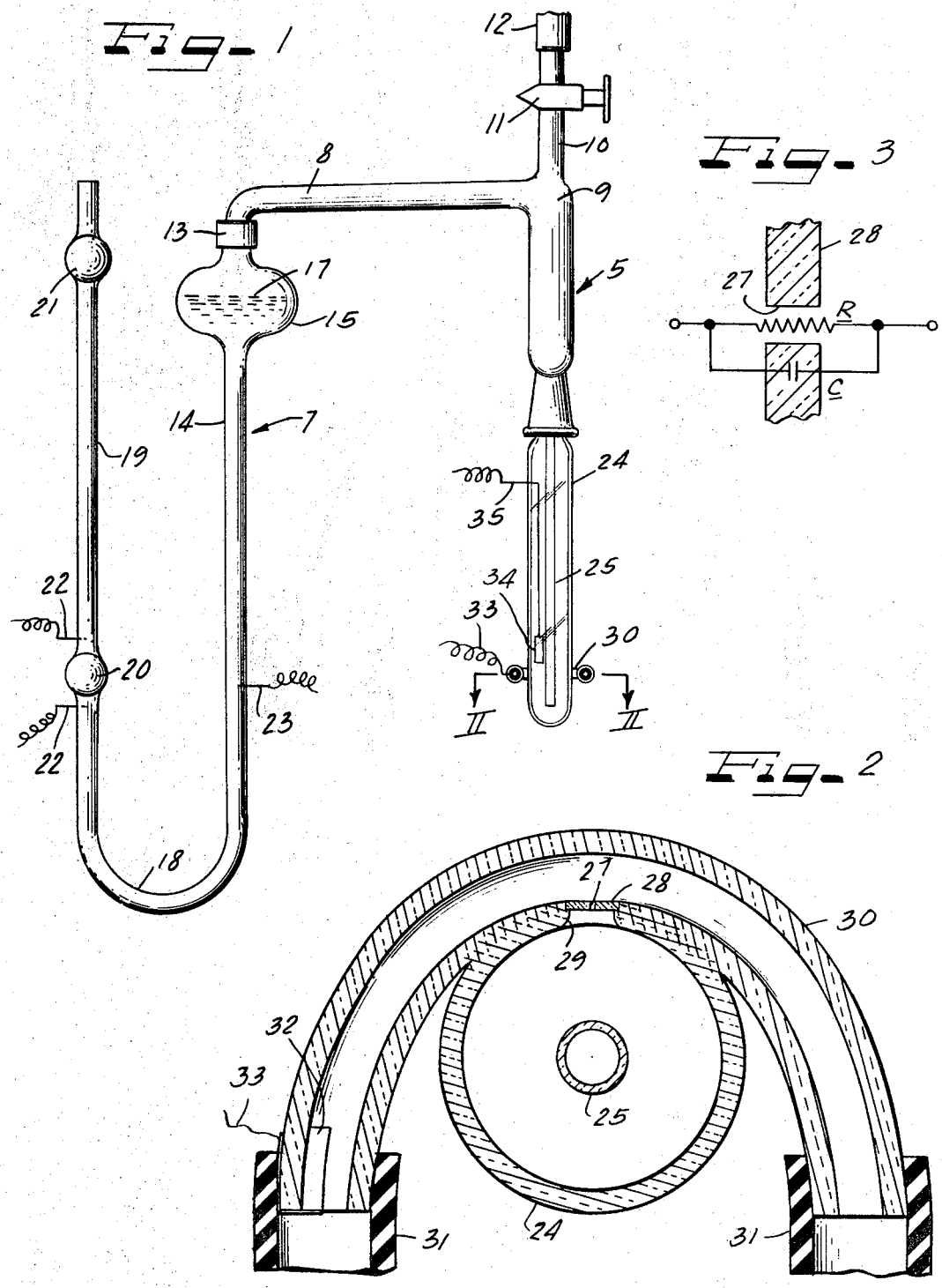

3,554,037
CONTINUOUS FLOW PIPELINE SAMPLING ORIFICE ARRANGEMENT
Robert H. Berg, 196 Clinton Ave., Elmhurst, Ill. 60126
Filed May 9, 1968, Ser. No. 727,823
Int. Cl. G01n 1/14; G01r 27/24
U.S. Cl. 73—422
10 Claims

ABSTRACT OF THE DISCLOSURE

A fluid sampling device has a hollow member which provides a chamber having a wall, a sampling duct is attached intermediate its length to the chamber wall and an orifice common to the united walls provides a passageway between the passage and the duct and the chamber for samplings of fluid such as for detecting or measuring particles present in the fluid by modulation of an electrical current passing through or across the orifice.

---

This invention relates to sampling devices and is more particularly concerned with a flow-by pipe line sampling orifice arrangement.

Fluid sampling devices, especially of the kind employed in particle sensing apparatus, have heretofore employed a test tube-like orifice tube having an orifice in its wall, and the fluid of which a sample is to be analyzed is received in a container such as a laboratory beaker in which the orifice portion of the tube is immersed. This required special stand equipment, and runs the hazard of spillage, contamination, and the like, attendant upon handling and environmental conditions. Further, by reason of the large area of the orifice tube exposed to the fluid sample to be tested there is relatively high capacitance to the electrical current across the orifice.

Where particle analysis, and the like, of fluid running through pipes has been desired, it has heretofore been customary to draw off a sample in a beaker and carry it to the orifice tube, with all of the consequent disadvantages, including those alluded to above.

An important object of the present invention is to overcome the deficiencies and disadvantages of the prior fluid sampling devices, and to provide a new and improved construction which eliminates the need for a beaker or other container in association with the orifice tube.

Another object of the invention is to provide a new and improved fluid sampling device in which an orifice tube and a sampling duct are joined to enable direct connection to a body of fluid from which samples are to be studied, such as a continuous flow pipe line.

A further object of the invention is to provide a new and improved combination orifice tube and sampling duct structure.

Still another object of the invention is to provide a new and improved sampling device comprising an orifice tube and sampling duct which is efficient in operation and simple and easy to clean.

A further object of the invention is to reduce substantially the capacitance across the orifice in a sampling device of the character indicated.

Other objects, features and advantages of the present invention will be readily apparent from the following detailed description of a preferred embodiment thereof taken in conjunction with the accompanying drawing, in which:

FIG. 1 is a side elevational view of fluid sampling apparatus embodying features of the invention;

FIG. 2 is an enlarged transverse sectional detail view taken substantially on the line II—II of FIG. 1, and FIG. 3 is a greatly enlarged, schematic illustration of the orifice area of the device.

An example of apparatus with which the present invention is efficiently usable shown in FIG. 1 and comprises a fluid handling section 5 and a metering siphon section 7. These sections are connected by a duct 8 which may be a tubular glass arm leading off laterally from a downwardly extending handling section tubular glass body 9 from the upper end of which extends a tubular suction head 10 having a valve 11 for controlling application of vacuum to the body 9 as effected by a suitable vacuum pump through a duct 12 attached to the head 10. Attachment of the outer end of the arm 8 to the metering siphon section 7 is through a coupling 13 to the upper end of a tubular glass mercury column 14 having adjacent to its upper end a reservoir enlargement 15 for a body of mercury 17. At its lower end, the mercury column tube 14 is united by a gooseneck 18 to a vertical metering tube portion 19 having intermediate its length a small volume reservoir enlargement 20, and adjacent to its upper end and at a higher elevation than the bulb reservoir 21. Electrical connections with evaluation apparatus are effected in respect to the metering column 19 through suitable probe electrodes 22 located at the respectively upper and lower sides of the reservoir 20, and a grounding probe electrode 23 may be located in the mercury column 14.

Detachably secured to and in communication with the lower end of the tubular body 9 is a test tube-like vertically elongated orifice tube 24 which has a closed bottom in adjacent spaced relation to which extends a suction tube 25 projecting downwardly from the suction head 10 in spaced preferably concentric relation through the body 9 and within the orifice tube 24. Suction through the tube 25 creates a vacuum within the tube 24 which is reflected through the tubular body 9, the duct arm 8 and the reservoir 15 to raise the mercury column to affect the electrodes 22. On shutting off the vacuum, dropping of the mercury 17 in the reservoir 15 effects siphoning of a metered volume of fluid through an orifice 27 (FIG. 2) which provides an opening into the chamber within the hollow tube member 24 through its wall. In a preferred construction, the orifice 27 is in an orifice disk 28 mounted in the tube wall across a suitable aperture 29 and with the outer surface of the disk exposed at the outside of the tube.

In order to enable connection of the orifice 27 with a source of fluid, such as a mixture or suspension of a liquid and particles to be measured as to number and/or size, a sampling duct 30 is attached to the tubular hollow member 24 at the outer surface thereof and in communication with the orifice. The duct 30 is dimensioned and the construction and arrangement is such as to leave the orifice 27 and a substantial area thereabout accessible for cleaning by means of a cleaning tool received through the duct. To this end, a desirable construction comprises having the orifice tube 24 and the duct 30 both made from a compatible material, glass being indicated in the illustrated example, and with the two members fused together in assembly. For continuous flow sampling, the duct 30 comprises a length of tubing of suitable bore diameter intermediately fused to the outer side of the wall of the orifice tube 24 about the area of the orifice 27. Thereby, in the area of fusion the wall of the duct and the wall of the orifice tube become integral and provide a fully sealed relationship entirely about the area of the orifice. Further, the orifice disk 28 is thus, in effect, as advantageously mounted in the tube wall of the duct 30 as it is in the wall of the tube 24.

Desirably, the duct 30 is structurally related in transverse relation to the orifice tube 24 so that at least one end of the duct is readily accessible at one side of the orifice tube, and the opposite end of the duct may also be accessible at the same side or it may be oriented for access from another side, as will be readily apparent. This may be accomplished with glass or similar tubing. In this instance the duct 30 is of generally semi-circular shape in longitudinal extent so that it is, in effect, partially wrapped around the orifice tube 24 and has both ends projecting in the same direction at the desired side of the orifice tube, such as at the front or approach side for convenience in receiving suitably attached or coupled thereto the separated end portions of a conduit 31 or separate conduits through which a fluid to be sampled is adapted to flow. Where, instead of being connected into a continuous or flow-by line, the duct 30 is to be connected only to an intermittent sample take-off line or conduit, one end of the duct 30 may be stoppered, valved or otherwise closed off in a suitable manner to open it for spill-out, flushing, dumping or cleaning.

Cleaning of the inside of the duct 30 may be readily effected in any suitable manner and with any suitable means. A cleaning tool such as a brush is readily received therethrough. Cleaning access of the orifice 27 and the area thereabout, and more particularly the orifice disk 28, by a cleaning tool, is efficiently convenient by reason of mounting of the orifice disk 28 in the generally common wall area where the duct bore wall surface is substantially tangent to the outer surface of the orifice tube wall.

Apparatus as disclosed herein is especially useful in association with analyzing apparatus of the kind represented by that available under the trademark "Celloscope" from Particle Data, Inc., Elmhurst, Illinois, which operates on the principle of passing a sample of the fluid through an orifice providing a properly constricted path for an electrical current. Sensing of particles flowing through the orifice is effected by modulation of the electrical current by the particles, such modulation being amplified and suitably recorded, totalized, visually observed on an oscilloscope, and the like. To produce the electrical current through the orifice 27, an electrode 32 is adapted to be mounted in the passage within the sampling duct 30 and connected by means of an electrical lead 33 into the electrical circuit of the associated apparatus. Although, if preferred, the electrode 32 may be a probe type extending through the wall of the duct 30, in a convenient form, as shown, it comprises a piece of electrically conductive material such as a piece of suitable metal foil, although it may also be a piece of wire, having a body portion within the duct passage in electrical contact with the fluid passing therethrough and extending over the adjacent edge of the duct for outside connection to an electrical lead 33. Within the orifice tube 24 is a second electrode 34 connected as by means of a lead 35 in the electrical circuit of the associated apparatus. Through this arrangement the electrical current is carried by the fluid in the system from and between the chamber within the orifice tube 24 and the passage in the duct 30 and through the orifice 27.

In addition to the other advantages of the invention over prior arrangements, improved sensing and measurement accuracy through the orifice 27 is attained because the electrical capacitance across the orifice is greatly reduced. There is a minimum wall area contiguous to the orifice disk 27, and relative to which the fluid flows continuously or intermittently. On reference to FIG. 3 this feature is graphically illustrated, wherein R indicates resistance and C represents capacitance. In the equation $T = R \times C$, and wherein T represents time, the low volume of fluid contiguous to the orifice 27 at its entrance end substantially reduces the capacitance and thus significantly reduces the time for electrical signal response through the orifice. Individual signal pulses are shortened and thus resistance responsiveness to closely successive particles through the orifice is more sharply defined, avoiding count errors due to overlapping and missed signals.

From the foregoing it will be appreciated that the present invention provides a novel sampling orifice arrangement which eliminates the customary container or beaker for the fluid to be tested. It enables connection of the orifice directly to a pipeline, batch treatment receptacle vat, storage receptacle, and the like, for continuous or periodic sampling or measuring. In the beverage industry this novel arrangement is especially useful for continuous or intermittent monitoring for cleanliness, culture growth, and the like. The device is quite versatile in that by the proper selection of orifice size a wide range of conditions may be accommodated.

It will be understood that modifications and variations may be effected without departing from the scope of the novel concepts of the present invention.

I claim as my invention:

1. In a fluid sampling device of the character described:
   a hollow member of fusible material having a wall enclosing a chamber arranged to be connected to pressure differential for drawing fluid from the chamber;
   a sampling duct, of fusible material compatible to the material of said member, having a passage therethrough and having a wall with an area thereof intermediate its length fused integrally in sealing relation to a corresponding area of said member wall so that the walls in the fused areas are combined into a common wall area; and
   an orifice through and surrounded by the fused common wall area and providing a restricted passageway connecting said duct passage and said chamber and through which fluid is adapted to move from the duct passage into the chamber in response to said pressure differential.

2. A device according to claim 1, in which said hollow member wall is of arcuate form and said duct passage is generally tangent to an outside surface of the member wall.

3. A device according to claim 1, having said hollow member in the form of an elongated glass orifice tube, said duct comprising a tubular glass piece supported by and extending transversely relative to the length of the orifice tube and having an end accessible at one side of the orifice tube for connection to a fluid conduit.

4. A device according to claim 3, said duct piece being generally semicylindrical in longitudinal extent and partially wrapped around the orifice tube and having two ends accessible at said side of the orifice tube.

5. A device according to claim 3, including an electrode carried by said end of the duct and having a portion inside the duct passage and a portion outside the duct for connection with electrical apparatus.

6. A device according to claim 1, the material of said member and said duct being dielectric, electrode means in said chamber, and electrode means in said duct passage for effecting an electrical current in said passage and said chamber and through said orifice passageway.

7. A device according to claim 1, said orifice comprising an orifice disk mounted in said common wall area.

8. A device according to claim 1, especially adapted for sensing and analyzing particles passing through said orifice with fluid moving through the orifice from said duct passage into said hollow member chamber, including means for producing an electrical current to pass through said orifice in the fluid moving therethrough, said common area about said orifice being restricted to limit the fluid to low volume at the entrance end of the orifice and thereby minimizing capacitance and thus the time for electrical signal response through the orifice to provide short pulse sharply defined individual electrical resistance responsiveness across the orifice for closely successive particles.

9. In a method of sensing and analyzing particles by passing a sample of a liquid carrying particles through an orifice in a chambered hollow member in the presence of an electrical current passing through said liquid from one side to the other of said orifice and in which said current is modulated by the particles, the improvement comprising transferring said liquid from a supply duct to said hollow member through an orifice formed in a wall common to said duct and to said hollow member; said common wall being intermediate the ends of said duct and being limited to the area immediately surrounding said orifice whereby the volume of liquid contiguous to the orifice at its entrance end is reduced, thereby reducing the electrical capacitance across the orifice.

10. A method in accordance with claim 9 in which a metered sample of said liquid carrying particles is transferred from said duct to said member through said orifice by lowering a predetermined amount, a column of mercury connected by a closed conduit to said chamber above the liquid level therein,

References Cited

UNITED STATES PATENTS

| | | | |
|---|---|---|---|
| 3,299,354 | 1/1967 | Hogg | 324—71 |
| 3,165,693 | 1/1965 | Isreeli et al. | 324—71 |
| 3,340,471 | 9/1967 | Coulter | 324—71 |
| 3,266,526 | 8/1966 | Berg | 324—71 |
| 3,188,565 | 6/1965 | Kolb | 73—422UX |

S. C. SWISHER, Primary Examiner

U.S. Cl. X.R.

324—71